United States Patent [19]
Tsunemine et al.

[11] Patent Number: 6,121,355
[45] Date of Patent: *Sep. 19, 2000

[54] WATER-DISPERSION TYPE PRESSURE-SENSITIVE ADHESIVE COMPOSITION, METHOD OF PRODUCTION THEREOF, AND PRESSURE-SENSITIVE ADHESIVE PRODUCT EMPLOYING THE SAME

[75] Inventors: Naoki Tsunemine, Suita; Yasumasa Tanaka, Kakogawa; Akikazu Banba, Ibaraki, all of Japan

[73] Assignee: Nippon Shokubai Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,590

[22] PCT Filed: Mar. 21, 1996

[86] PCT No.: PCT/JP96/00740

§ 371 Date: Dec. 12, 1996

§ 102(e) Date: Dec. 12, 1996

[87] PCT Pub. No.: WO96/29373

PCT Pub. Date: Sep. 26, 1996

[30] Foreign Application Priority Data

Mar. 22, 1995 [JP] Japan .................................. 7-062966

[51] Int. Cl.[7] ........................................ C08K 5/10
[52] U.S. Cl. ........................................ 524/270
[58] Field of Search ............................. 524/270

[56] References Cited

U.S. PATENT DOCUMENTS

| | | | |
|---|---|---|---|
| 3,890,292 | 6/1975 | Bohme | 524/16 |
| 4,061,611 | 12/1977 | Glowaky | 524/51 |
| 4,250,070 | 2/1981 | Ley | 524/555 |
| 4,376,844 | 3/1983 | Emmons | 525/117 |
| 4,562,225 | 12/1985 | Huber | 524/602 |
| 4,670,501 | 6/1987 | Dymond | 524/458 |
| 4,735,981 | 4/1988 | Rich | 524/501 |
| 4,931,494 | 6/1990 | Auchter | 525/376 |
| 4,987,186 | 1/1991 | Akiyama | 525/329.5 |
| 4,988,762 | 1/1991 | Overbeek | 525/329.9 |
| 5,081,173 | 1/1992 | Taylor | 524/832 |
| 5,115,035 | 5/1992 | Shiraki | 523/217 |
| 5,116,676 | 5/1992 | Winslow | 524/145 |
| 5,147,938 | 9/1992 | Kuller | 525/276 |
| 5,229,447 | 7/1993 | Miyajima | 524/556 |
| 5,500,470 | 3/1996 | Mirle | 524/502 |
| 5,565,268 | 10/1996 | Zajaczkowski | 524/555 |
| 5,670,557 | 9/1997 | Dietz | 524/522 |
| 5,856,394 | 1/1999 | Hirashima | 524/545 |

FOREIGN PATENT DOCUMENTS

| | | |
|---|---|---|
| 0 590 886 | 4/1994 | European Pat. Off. . |
| WO 93/08239 | 4/1993 | WIPO . |

OTHER PUBLICATIONS

Chemical Abstracts, Columbus, Ohio, US (vol. 84, Mar. 8, 1976, No. 10, p. 57) Abstract No. 60752r "Water Resistant Adhesives".

*Primary Examiner*—Edward J. Cain
*Attorney, Agent, or Firm*—Oblon, Spivak, McClelland, Maier & Neustadt, P.C.

[57] ABSTRACT

The present invention discloses a water-dispersion type pressure-sensitive adhesive composition, a method for producing the same, and a pressure-sensitive adhesive product employng the same. With the present invention, the hydrophilic nature of dispersant (C) can be nullified by reacting a compound (B), containing a metal having a valence of at least two or having a specific functional group having reactivity, with the functional groups of dispersant (C), with the result that while being a water dispersion type pressure-sensitive adhesive composition, it displays excellent water resistance properties on a par with pressure-sensitive adhesives made from solvent type pressure-sensitive adhesive compositions.

4 Claims, No Drawings

WATER-DISPERSION TYPE PRESSURE-SENSITIVE ADHESIVE COMPOSITION, METHOD OF PRODUCTION THEREOF, AND PRESSURE-SENSITIVE ADHESIVE PRODUCT EMPLOYING THE SAME

FIELD OF THE INVENTION

The present invention relates to a water-dispersion type pressure-sensitive adhesive composition which is excellent in terms of balance between water resistance and adhesive strength, balance between moisture resistance and adhesive strength, balance between cohesive strength and adhesive strength, and adhesiveness to a substrate. It also relates to a method of producing the same, and to a pressure-sensitive adhesive product employing the same.

BACKGROUND OF THE INVENTION

In consideration of various factors such as environmental protection, safety in the working environment, resource saving, cost etc. there has been a large trend in recent years away from supplying adhesives of solution type (using an organic solvent as solvent medium) and more to supplying adhesives in non-solvent type (which do not use organic solvents). Amongst these non-solvent type, the use of water-dispersion type, i.e. so-called emulsion type pressure-sensitive adhesives has been favoured in consideration of their general purposeness and workability.

However, with these water-dispersion type pressure-sensitive adhesives, it is necessary to have a dispersant such as an emulsifying agent in order to disperse the pressure-sensitive adhesive polymer into the aqueous medium, and since such dispersants are hydrophilic materials, there has been the major problem that the water resistance of such adhesives is poor compared to solvent-type adhesives. In addition to the reduction in water resistance, the presence of the dispersant also has a bad affect on the adhesive strength itself, balance between cohesion and adhesion, adhesiveness to a substrate, transparency etc. and at present there has not been developed a water-dispersion type pressure-sensitive adhesive which displays levels of water resistance and adhesive properties on a par with solvent types.

In an attempt to resolve the above-mentioned problems with water-dispersion type pressure-sensitive adhesives, there have been reported methods of improving the dispersion itself or adopting cross-linking means etc. As one such cross-linking means, there is known a method involving forming the dispersion by the copolymerization of monomers having functional groups when producing the pressure-sensitive adhesive polymer, and then adding a cross-linking agent which reacts with these functional groups. However, if the cross-linking is carried out to such an extent that a sufficient degree of water resistance can be realized, there then arises the problem that the flowability, which is necessary for wetting the adherend, is reduced with a consequent lowering in adhesive strength.

On the other hand, in Japanese Patent Application Publication No. H-1-221402, the applicant of this invention discloses that a water-dispersion type pressure-sensitive adhesive employing as an emulsifying agent a polymer having a specific structure is excellent in terms of several physical properties such as adhesive strength, water resistance, moisture resistance etc., and that by using a monomer having functional groups which can react with the carboxyl groups of the emulsifying agent as the monomer for the pressure-sensitive adhesive polymer, the emulsifying agent and the pressure-sensitive adhesive polymer react with each other after the formation of a layer of the pressure-sensitive adhesive i.e. after the adhesive is applied and dried to create a film, with a resulting further increase in the water resistance. However, when compared with the superior water resistance displayed by solvent-type pressure-sensitive adhesives, the pressure-sensitive adhesives disclosed in Japanese Patent Application Publication No. H-1-221402 cannot be described as satisfactory. The inventors of the present invention made continued studies with a view to increasing the water resistance, and found that it is not desirable to just simply increase the amount of functional groups in the pressure-sensitive adhesive polymer, since the result is that the adhesive strength is reduced thereby causing problems with respect to the balance between water resistance and adhesive strength, and that the polymerization stability is lowered.

In Japanese Patent Publication No. H-2-3432, there is disclosed an invention which involves synthesizing a water dispersion of the pressure-sensitive adhesive polymer by an emulsion polymerization method using an emulsifying agent having functional groups which can react with isocyanate groups, adding to this water dispersion a non-water-miscible organic solution of a polyisocyanate compound and then reacting the two in the water-dispersed state until no remaining isocyanate groups can be detected The pressure-sensitive adhesive of that invention is disclosed to be excellent in terms of adhesive strength and retention of moisture resistance. However, since the method involves reacting the functional groups of the emulsifying agent and the isocyanate compound in the water-dispersed state, then even when both have been reacted together until no isocyanate groups are detected, it is still necessary that many of the hydrophilic groups in the emulsifying agent still remain in order that a stable water-dispersed state be maintained. In other words, if all the hydrophilic groups in the emulsifying agent react with the isocyanate groups, then it becomes impossible to maintain a stable water-dispersed state. However, in the invention of Japanese Patent Publication No. H-2-3432, there was no recognition of the problem associated with reacting all the hydrophilic functional groups in the emulsifying agent.

Furthermore, although it is disclosed that the pressure-sensitive adhesive of that invention is excellent in terms of adhesive strength and retention of moisture resistance, the value for retention of water resistance disclosed therein is a value which was measured at a level of humidity of 65% at the most. When compared with severe water resistance tests involving immersion in water, this is a value of rather gentle condition, and the adhesive can hardly be described as being excellent in terms of "water resistance". Furthermore, since isocyanate groups are highly reactive with water, they will be consumed by the water constituting the dispersing medium, causing problems with respect to reproducibility of performance such as adhesion strength, retention of moisture resistance.

It is therefore an objective of the present invention to significantly increase the water resistance of water-dispersion type pressure-sensitive adhesives and develop a water-dispersion type pressure-sensitive adhesive composition having a level of water resistance equal to or better than that of solvent-type pressure-sensitive adhesive compositions, and a method for producing the same. It is a further objective of the present invention to provide a pressure-sensitive adhesive product which is excellent in terms of water resistance, moisture resistance and balance between cohesive strength and adhesive strength and which displays excellent adhesiveness to a substrate.

DISCLOSURE OF THE INVENTION

The chief characteristic feature of the water-dispersion type pressure-sensitive adhesive composition of the present invention is that it comprises;

- a pressure-sensitive adhesive polymer (A);
- a compound (B) which is a compound having in its molecule at least one functional group selected from the group consisting of a carboxyl group, an amino group, a glycidyl group, an aziridinyl group, an acetoacetyl group, an oxazolinyl group, a mercapto group, a hydrazide group and an aldehyde group, or a compound containing a metal having a valence of at least 2; and
- a dispersant (C) which has a functional group which reacts with compound (B).

A preferred embodiment of the composition of the present invention is one having as compound (B), a compound (B-2) containing in its molecule at least two functional groups of one type selected from the group consisting of a carboxyl group, an amino group, a glycidyl group, an aziridinyl group, an acetoacetyl group, an oxazolinyl group, a mercapto group, a hydrazide group and an aldehyde group. Compound (B) can be described as a "trapping agent" which captures the hydrophilic functional groups of the dispersant (C), or as a "capping agent" which blocks the same functional groups. With the water-dispersion type pressure-sensitive adhesive composition of the present invention, there is substantially no reaction between compound (B) and dispersant (C) while it remains in a water-dispersed state, and the reaction between compound (B) and dispersant (C) occurs only when or after the composition is coated and dried to evaporate the water. Accordingly, when it is in the water dispersed state, a stable water dispersion is maintained by the hydrophilic functional groups of the dispersant, and after it is coated and dried to use it as an adhesive product, it displays extremely high water resistance since the hydrophilic functional groups of the dispersant (C) are rendered hydrophobic by compound (B).

In an embodiment of composition of the present invention which is preferred in that it displays excellent water resistance and adhesiveness, pressure-sensitive adhesive polymer (A) is a polymer made from polymerizable monomer components comprised of, as essential monomers, at least one kind of alkyl(meth)acrylate having an alkyl group having 4 to 14 carbon atoms, and at least one kind of unsaturated monomer having a solubility parameter of at least 11; and dispersant (C) is a water soluble or water dispersible polymer (c) (and/or salt thereof) having an acid value of at least 200 and obtained by the polymerization, in the presence of an alkyl mercaptan whose alkyl group has 6 to 18 carbon atoms, of a polymerizable monomer components comprising, as an essential monomer, an unsaturated carboxylic acid.

One example of a method for producing the above-described water-dispersion type pressure-sensitive adhesive composition involves the steps of polymerizing in the presence of water and dispersant (C) the polymerizable monomer component constituting the starting material of the pressure-sensitive adhesive polymer, and then adding compound (B). Another possible method involves first synthesizing pressure-sensitive adhesive polymer (A) and then dispersing it in water using dispersant (C) followed by adding compound (B).

The chief characteristic of the pressure-sensitive adhesive product of the present invention is that it is a pressure-sensitive adhesive product having provided a pressure-sensitive adhesive layer using a water dispersion type pressure-sensitive adhesive composition comprising:

- a pressure-sensitive adhesive polymer (A);
- a compound (B) which is a compound having in its molecule at least one type of functional group selected from the group consisting of a carboxyl group, an amino group, a glycidyl group, an aziridinyl group, an acetoacetyl group, an oxazolinyl group, a mercapto group, a hydrazide group and an aldehyde group or a compound containing a metal having a valence of at least 2; and
- a dispersant (C) having a functional group which reacts with compound (B).

In a preferred embodiment, it is an adhesive product provided with pressure-sensitive adhesive layer employing a water-dispersion type pressure sensitive adhesive composition made by polymerizing the polymerizable monomer components which constitute the starting material of pressure-sensitive adhesive polymer (A) in the presence of water and dispersant (C), and then adding compound (B).

The present invention also includes a pressure-sensitive adhesive product having provided a pressure-sensitive adhesive layer, in which said pressure-sensitive adhesive layer is a film made of a water-dispersion type pressure-sensitive adhesive composition substantially containing pressure-sensitive adhesive polymer (A), compound (B) and dispersant (C) having functional groups which react with compound (B), and in which the hydrophilic nature of the dispersant (C) can be reduced through reactions between compound (B) and dispersant (C).

MOST PREFERRED EMBODIMENTS OF THE PRESENT INVENTION

The present invention is characterized in that the water resistance of the pressure-sensitive adhesive can be increased remarkably by nullifying the hydrophilic nature of the dispersant (C), through reaction of the hydrophilic functional groups of the dispersant (C) used to make the pressure-sensitive adhesive polymer (A) into a water dispersion, with compound (B) which is capable of reacting with the functional groups. The present invention shall be explained in more detail hereunder.

There are no particular limitations regarding the kind of polymer which can be used as the pressure-sensitive adhesive polymer (A) which constitutes one essential component of the water-dispersion type pressure-sensitive adhesive composition of the present invention, provided that it is a polymer which can display pressure-sensitive adhesiveness in a temperature range at which pressure-sensitive adhesive products are generally used, and which does not dissolve in water but can be made into a water dispersion.

Specific examples of pressure-sensitive adhesive polymers which can be obtained easily include polymers having polyalkylacrylate as a main component, natural rubbers, styrene-isoprene-styrene (SIS) block copolymers, styrene-butadiene-styrene (SBS) block copolymers, and synthetic rubbers etc.

In order to optimize the balance between cohesive strength and adhesive strength and the balance between water resistance and adhesive strength, and obtain a pressure-sensitive adhesive which is excellent in terms of adhesiveness with respect to a substrate, it is preferable to use, as the pressure-sensitive adhesive polymer (A), a polymer made from monomer components including, as essential monomers, at least one type of alkyl(meth)acrylate monomer having an alkyl group having 4 to 14 carbon atoms and at least one type of monomer having a solubility parameter of at least 11.

In the present invention, an amount δ defined by δ=(ΔH/V)$^{1/2}$, where V is the molar volume, and ΔH the molar heat of vaporization of the material, is used as the solubility parameter. With respect to this solubility parameter, methods for the calculation thereof and calculated values thereof are disclosed in, for example, the second chapter (page 39 onwards) of "Handbook of Painting and Printing of Plastics".

Specific examples of the alkyl (meth)acrylate monomer having an alkyl group having 4 to 14 carbon atoms include butyl (meth)acrylate, amyl(meth)acrylate, heptyl (meth)acrylate, 2-ethylhexyl(meth)acrylate, n-octyl(meth)acrylate, isooctyl (meth)acrylate, n-nonyl (meth)acrylate, iso-nonyl (meth)acrylate lauryl (meth)acrylate, tridecyl (meth)acrylate, etc. One or more types of these can be used.

It is preferred that the amount of these alkyl (meth) acrylates used be at least 50 weight percent of the total monomer components which compose the pressure-sensitive adhesive polymer (A). If less than 50 weight percent is used, then it becomes difficult to realize excellent adhesive properties.

Specific examples of monomers having a solubility parameter of at least 11 include, N,N-dimethyl acrylamide, acrylamide, methacrylamide, N-isopropyl acrylamide, N-vinyl pyrrolidone, 2-hydroxyethyl acrylate, 2-hydroxyethyl methacrylate, N,N-dimethylaminoethyl (meth)acrylate etc. With respect to the solubility parameters of the monomers, methods for the calculation thereof, and calculated values thereof are disclosed in chapter 2 (page 39 onwards) of the "Handbook of Painting and Printing of Plastics".

When using these monomers, it is preferable that the amount used thereof be at least 0.1 weight percent of the total monomers which compose the pressure-sensitive adhesive polymer (A). The use of a monomer having a solubility parameter of at least 11 as an essential component is desirable since it is thereby easy to obtain a good balance between water resistance and adhesive strength. In consideration of adhesive properties, it is preferred that the upper limit of the solubility parameter be no more than 15.

In addition to the above-described alkyl (meth)acrylate monomers and monomers having a solubility parameter of at least 11, it is also possible to use together therewith other monomers which are copolymerizable with the above monomers, to the extent that it does not hinder the effect of the present invention.

Examples of such "other" monomers include alkyl (meth) acrylates having an alkyl group having no more than 3 carbon atoms, (meth)acrylates having a functional group such as a carboxyl group, hydroxyl group etc., aromatic unsaturated hydrocarbons such as styrene, α-methyl styrene, aliphatic unsaturated hydrocarbons such as ethylene, butadiene, vinyl esters such as vinyl acetates, vinyl ethers such as methyl vinyl ether, unsaturated cyanide compounds such as acrylonitrile, etc. The use of a lot of (meth)acrylates or other unsaturated monomers having functional groups which are capable of reacting with the functional groups of compound (B) or dispersant (C), leads to the result that all three components, namely pressure-sensitive adhesive polymer (A), compound (B) and dispersant (C), bond together through a cross-linking reaction thereby causing a slight reduction in adhesiveness, which is undesirable in the case that the use of the adhesive product demands high adhesiveness. Of course, it is possible to use such monomers to the extent that they do not impair the adhesiveness.

It is preferred that the glass transition temperature, Tg, of pressure-sensitive adhesive polymer (A) be in the range of −20° C. to −70° C. The glass transition temperature, Tg(K) is calculated according to the following formula.

$$\frac{W}{Tg} = \frac{W_1}{Tg_1} + \frac{W_2}{Tg_2} + \ldots + \frac{W_n}{Tg_n}$$

wherein $W_n$ is the weight fraction of each monomer; and $Tg_n$ is the Tg (K) of the homopolymer of each monomer.

Conventionally well-known methods can be used to synthesize the pressure-sensitive adhesive polymer (A). Examples include emulsion polymerization, suspension polymerization, bulk polymerization and solution polymerization. Due to the fact, that in the present invention, the pressure-sensitive adhesive polymer (A) is made into a water dispersion, it is most convenient to synthesize it by an emulsion polymerization method. Of course however, it is also possible to first synthesize pressure-sensitive adhesive polymer (A) using a polymerization method other than emulsion polymerization, and then to make it into a water dispersion using dispersant (C).

All kinds of the conventionally known emulsion polymerization methods can be adopted as the emulsion polymerization method in the present invention. For example, a method in which the monomers, deionized water and a polymerization initiator are all mixed together and polymerized using the after-mentioned dispersant (C) as the emulsifying agent, or a polymerization method in which the monomer is added gradually, or a monomer emulsion addition polymerization method, or a seed polymerization method can be used. The polymerization temperature should be in the range of 0 to 100° C., and preferably in the range of 50 to 90° C. It is preferred that the polymerization time be in the range of 1 to 10 hours. At the time of emulsion polymerization, it is possible to add hydrophilic medium or to add other conventionally well-known emulsifying agents in addition to dispersant (C) to the extent that there is no bad effect on the performance of the pressure-sensitive adhesive composition of the present invention.

Examples of initiators for use in emulsion polymerization include inorganic peroxides such as ammonium persulfate, potassium persulfate, hydrogen peroxide etc.; organic peroxides such as t-butyl hydroperoxide, succinic peroxide etc.; water soluble azo compounds such as azobis cyanovaleric acid etc. Furthermore, it is also possible to use redox initiators in which these peroxides are used together with reducing agents such as sodium sulfite, sodium formaldehyde sulphoxylate, ascorbic acid etc. At the time of polymerization, it is also possible to use as molecular weight regulators alkyl mercaptans such as dodecylmercaptan, such that the molecular weight of the polymer does not become too high.

Compound (B), which constitutes an essential component of the water dispersion type pressure-sensitive adhesive composition of the present invention, is a compound which has the action of forming chemical bonds with the large number of hydrophilic functional groups of the dispersant (C), which is provided for stably dispersing the pressure-sensitive adhesive polymer (A) in water, to thereby nullify the hydrophilic nature of the dispersant (C). By this action, it is possible to remarkably increase the water resistance of the pressure-sensitive adhesive obtained. Accordingly, compound (B) can be described as a "trapping agent" which captures the hydrophilic functional groups of the dispersant (C) or as a "capping agent" which blocks the same functional groups.

Compound (B) is a compound having in its molecule at least one kind of functional group selected from the group consisting of a carboxyl group, an amino group, a glycidyl group, an aziridinyl group, an acetoacetyl group, an oxazolinyl group, a mercapto group, a hydrazide group and an aldehyde group, or it is a compound containing a metal having a valence of two or more.

Compounds (B) can be divided into those compounds which have in their molecule only one functional group selected from the above-listed group of functional groups (called (B-1) compounds), those compounds which have in their molecules two or more of the above-mentioned functional groups (called (B-2) compounds), and those compounds which contain a metal having a valence of two or more (called (B-3) compounds).

Monofunctional compounds (B-1) react with dispersant (C) to thereby capture one of the hydrophilic groups of dispersant (C) and nullify the hydrophilic nature thereof. Multi-functional compounds (B-2) can react with two or more molecules of dispersant (C), and thus the molecules of dispersant (C) become bonded to each other through compound (B-2) with the result that the molecular weight of the dispersant is substantially increased. An increase in the molecular weight of the dispersant (C) results in a heightening of the hydrophobic nature thereof, which together with the hydrophilic group capturing effect makes it possible to more surely nullify the hydrophilic nature of the dispersant (C). The plurality of functional groups contained in compound (B-2) can be all the same type or they can be different types. Compound (B-3), which is a compound containing a metal having a valence of two or more, has the same effect as compound (B-2). Accordingly, of all the types of compound (B), it is rather preferable to use a compound (B-2) or a compound (B-3) rather than a compound (B-1).

Examples of compound (B-1) include the type of compounds listed below.

Carboxyl group-containing compounds:
Aliphatic carboxylic acids such as propionic acid; aromatic carboxylic acids such as benzoic acid; etc.

Amino group-containing compounds:
Aliphatic amines such as butyl amine; aromatic amines such as phenyl amine; etc.

Glycidyl group containing compounds:
Aliphatic oxides such as propylene oxide; aromatic oxides such as styrene oxide; alicyclic epoxides such as cyclohexene oxide; aliphatic glycidyl ethers such as EPOLIGHT® M-1230 (made by KYOEISHA CHEMICAL CO., LTD.); aromatic glycidyl ethers such as phenyl glycidyl ether; glycidyl esters such as glycidyl (meth)acrylate; etc.

Aziridinyl group-containing compounds:
Aliphatic aziridines such as butylaziridine; aromatic aziridines such as phenylaziridine; unsaturated aziridines such as 2-(1-aziridinyl) ethylmethacrylate; etc.

Acetoacetyl group containing compounds:
Alkyl acetoacetates such as ethyl acetoacetate; aromatic acetoacetates such as acetoacetyl anilide; etc.

Oxazolinyl group-containing compounds:
Aliphatic oxazolines such as 2-methyl oxazoline; aromatic oxazolines such as 2-phenyl oxazoline; unsaturated oxazolines such as 2-isopropenyl-2-oxazoline; etc.

Mercapto group-containing compounds:
Aliphatic mercaptans such as n-hexyl mercaptan; aromatic mercapatans such as thiophenol; alkyl mercaptoacetates such as butyl thioglycolate; heterocyclic mercaptans such as 1-methyl-5-mercapto-1,2,3,4-tetrazole; etc.

Hydrazide group-containing compounds:
Aliphatic hydrazides such as lauric acid hydrazide; aromatic hydrazides such as salicylic acid hydrazide; and heterocyclic hydrazides such as pyrazole; etc.

Aldehyde group-containing compounds:
Aliphatic aldehydes such as n-hexyl aldehyde; aromatic aldehydes such as benzaldehyde; etc.

Examples of compounds (B-2) include the following type of compounds:

Carboxyl groups-containing compounds:
Aliphatic polycarboxylic acids such as dodecanedioic acid; aromatic polycarboxylic acids; copolymers of unsaturated monomers containing carboxyl groups (eg. acrylic acid etc.).

Amino groups-containing compounds:
Aliphatic polyamines such as triethylene tetramine; alicyclic polyamines such as isophoronediamine; aromatic polyamines such as diaminophenylmethane; polyamideamines; POLYMENT® series made by NIPPON SHOKUBAI CO., LTD.; etc.

Glycidyl groups-containing compounds:
Polyglycidylamines (eg. TETRAD® series made by MITSUBISHI GAS CHEMICAL CO., LTD., etc.); polyglycidyl ethers (eg- DENACOL® series made by NAGASE & CO., LTD., etc.); etc.

Aziridinyl groups-containing compounds:
CHEMITITE® series made by NIPPON SHOKUBAI CO., LTD., etc.

Acetoacetyl groups-containing compounds:
Copolymers of unsaturated monomers containing acetoacetyl groups (acetoacetoxyethyl methacrylate etc.) etc.

Oxazolinyl groups-containing compounds:
EPOCROSS® series made by NIPPON SHOKUBAI CO., LTD., etc.

Mercapto groups-containing compounds:
Aliphatic polymercapto compounds such as 1, 6-dimercaptohexane; aromatic polymercapto compounds such as triazine thiol compounds; etc.

Hydrazide groups-containing compounds:
Isophthalic acid dihydrazide, adipic acid dihydrazide etc.

Aldehyde groups-containing compounds:
Dialdehydes such as glyoxal, terephthal aldehyde etc.; polyaldehydes such as copolymers of acrolein; etc.

Examples of compounds (B-2) which have different types of functional groups include amino acids such as glycine, phenyl aniline which have carboxyl groups and amino groups; thioglycolic acid and acetyl cysteine etc. which have carboxyl groups and mercapto groups; aminothiophenol etc. which have amino groups and mercapto groups; aminobenzaldehyde etc. which have amino groups and aldehyde groups; α-hydrazinoimidazole-4 (or 5)-propionic acid etc, which have carboxyl groups and hydrazide groups; etc.

Examples of compounds (B-3) which contain a metal having a valence of at least two, include metal oxides such as zinc oxide which is an oxide of a bivalent metal; metal salts such as chromium trifluoro acetate which is a salt of a bivalent metal; metal chelate compounds such as aluminium tris(acetyl acetonate) which is a chelate of a trivalent metal, and Zircozole made by Daiichi Kigenso Kagaku Kogyo Kabushild Kaisha which is a chelate of a quadrivalent metal; and metal halides such as zinc chloride which is a halide of a bivalent metal.

Dispersant (C), which is another of the essential components of the composition of the present invention, has functional groups which are capable of reacting with the functional groups of the above-described compound (B-1) or compound (B-2) or with the metal atom of metal compound (B-3) having a valence of at least two, and is capable of dispersing the pressure-sensitive adhesive polymer (A) in water. The term "dispersant" refers to a compound which in general has in a molecule both a hydrophobic (lipophilic) hydrocarbon group of a certain size, and a hydrophihic group for ensuring a stable dispersion, and can be called a surface active agent or a emulsifying agent.

The present invention is characterised in that the functional groups or metal atom of compound (B) and the many hydrophilic groups of the dispersant (C) chemically bond together to thereby nullify the hydrophilic nature of the dispersant (C), and thus there are no particular limitations regarding the hydrophilic functional groups of dispersant (C) provided they display reactivity with respect to the above-described compound (B), and are capable of stably dispersing the pressure-sensitive adhesive polymer (A) in water.

Specific examples of combinations of the functional group of compound (B) and the functional group of dispersant (C) which is capable of reacting with the functional group of compound (B) include: carboxyl groups and glycidyl groups; carboxyl groups and amino groups; carboxyl groups and aziridinyl groups; carboxyl groups and oxazolinyl groups; amino groups and carboxyl groups; amino groups and glycidyl groups; amino groups and acetoacetyl groups; glycidyl groups and carboxyl groups; glycidyl groups and amino groups; glycidyl groups and mercapto groups; aziridinyl groups and carboxyl groups; acetoacetyl groups and amino groups; acetoacetyl groups and hydrazide groups; acetoacetyl groups and aldehyde groups; oxazolinyl groups and carboxyl groups; oxazolinyl groups and mercapto groups; mercapto groups and glycidyl groups; mercapto groups and oxazolinyl groups; hydrazide groups and acetoacetyl groups; hydrazide groups and aldehyde groups; aldehyde groups and acetoacetyl groups; aldehyde groups and hydrazide groups; aldehyde groups and hydroxyl groups; metals having a valence of at least two and carboxyl groups; metals having a valence of at least two and acetoacetyl groups etc.. (In each of the above-listed combinations, the former is the functional group of compound (B)). Of course, the type of functional groups contained in the dispersant (C) is not limited to one, and thus there are many possible variations to the actual combinations between the functional groups of compound (B) and dispersant (C). Most preferred combinations are those in which compound (B) contains at least a glycidyl group and dispersant (C) contains at least a carboxyl group, and those in which compound (B) contains at least an aziridinyl group and dispersant (C) contains at least a carboxyl group.

Specific examples of easily obtained compounds which can be used as dispersant (C) include the following:

Amino group-containing dispersants:

Primary or secondary aliphatic amine salts; aminocarboxylates; salts of N-acylamino-acids; acyl peptides; polyoxyethylene alkyl amines; copolymers made from unsaturated monomers containing amino groups; etc.

Carboxyl group-containing dispersants:

Fatty acid soap; N-acylamino acids and salts thereof; alkyl ether carboxylic acids (for example, "MX-RLM" series made by Kao Corporation etc.); acyl peptides; carboxy betaine type surface active agents; aminocarboxylate; polycarboxylic acid type polymer surface active agents (for example, LATEMUL, DEMOL, POIZ and HOMOGENOL series made by Kao Corporation); etc.

In a preferred embodiment of the present invention, a water soluble or water dispersible polymer (c) having an acid value of at least 200, and which is obtained by the polymerization, in the presence of an alkyl mercaptan having 6 to 18 carbon atoms, of a polymerizable monomer including an unsaturated carboxylic acid as an essential component, and/or a salt thereof is used as dispersant (C). This is due to its excellent dispersion stability and its capability to remarkably improve the water resistance of the pressure-sensitive adhesive.

Examples of the unsaturated carboxylic acid used as an essential component when synthesizing the above-mentioned dispersant polymer (c) include (meth)acrylic acid, crotonic acid, maleic acid, fumaric acid, itaconic acid, or half esters of the dibasic acids listed above or salts etc. thereof. It is possible to use alone or a mixture of two or more of them.

The polymerizable monomer component used when synthesizing polymer (c) may be composed exclusively of the unsaturated carboxylic acid, but it may, as necessary, be used together with a monomer other than the unsaturated carboxylic acid. Examples include styrene derivatives such as styrene, vinyl toluene, $\alpha$-methylstyrene, chloromethylstyrene, styrene sulfonic acid and salts thereof, (meth)acrylamide derivatives such as (meth)acrylamide, N-monomethyl(meth)acrylamide, N-monoethyl (meth) acrylamide, N, N-dimethyl (meth)acrylamide; (meth) acrylates synthesized by the esterification of alcohols having 1 to 18 carbon atoms and (meth)acrylic acid, such as methyl (meth)acrylate, ethyl (meth) acrylate, butyl (meth)acrylate; (meth)acrylates containing a hydroxyl group such as 2-hydroxyethyl(meth)acrylate, 2-hydroxypropyl (meth) acrylate, monoesters of (meth)acrylic acid and polypropylene glycol or polyethylene gylcol; 2-sulfonic ethyl (meth) acrylate, or its salt, vinyl acetate, (meth)acrylonitrile etc. One of the types listed above or a mixture of two or more of them can be used.

It is preferred that the polymerizable monomer used together with the unsaturated carboxylic acid be used in such an amount that the acid value of the product polymer (c) is not less than 200. Furthermore, at the time of synthesis of polymer (c), it is preferred that the type and amount of such "other" monomer be selected taking into consideration the compatibility of polymer (c) with polymer (A) when pressure-sensitive adhesive polymer (A) is dispersed into water, or when pressure-sensitive adhesive polymer (A) is polymerized by emulsion polymerization using product polymer (c) as a dispersant.

Examples of the alkyl mercaptan having 6 to 18 carbon atoms used when synthesizing polymer (c) include: n-hexyl mercaptan, n-octyl mercaptan, n-dodecyl mercaptan, cetyl mercaptan, stearyl mercaptan etc., can be used alone or as a mixture of two or more of the them. The alkyl mercaptan is used to introduce alkyl groups onto the terminal of polymer (c) to give surface active properties thereto. Alkyl mercaptans having less than 6 carbon atoms cannot be used because of the low surface activity properties. The amount of alkyl mercaptan used is in the range of 2 to 300 parts by weight to 100 parts by weight of the monomer which forms polymer (c). It is undesirable to use it in an amount less than 2 parts by weight or more than 300 parts by weight, because the result is that the surface activity properties of dispersant (C) is poor.

When synthesizing polymer (c), a well-known oil soluble or water soluble polymerization initiator can be used. However, in order to efficiently produce polymer (c) having an alkyl group at its terminal, it is preferred that it be used in an amount of no more than 1 mole with respect to the alkyl mercaptan and more preferably no more than 0.1 moles. Polymer (c) can be produced by either a bulk polymerization, a solution polymerization or a suspension polymerization. It is preferred that the polymerization temperature be in the range of 50 to 150° C., and that the polymerization time be in the range of 1 to 8 hours. With respect to the solvent used in the case of solution polymerization, any solvent can be used provided that it is the one which dissolve the monomer components, alkyl mercaptan and radical polymerization initiator, and which does not hinder radical polymerization.

Polymer (c) itself has surface active properties, but in order to obtain a water dispersion type pressure-sensitive adhesive composition having excellent polymerization stability and storage stability, it is preferred to make polymer (c) into a salt by neutralizing some or all of the carboxyl groups before using it as dipersant (C).

Standard alkali compounds can be used as the neutralizing agent. Examples include alkali metal compounds such as sodium hydroxide, potassium hydroxide; alkaline earth metal compounds such as calcium hydroxide, calcium carbonate; ammonia; water soluble organic amines such as monoethylamine, dimethylamine, trimethylamine, monoethylamine, diethylamine, triethylamine, monopropylamine, dimethylpropylamine, monoethanolamine, diethanolamine, triethanolamine, ethylenediamine, diethylenetriamine; etc. One of the types listed above or a mixture of two or more of the types listed above can be used. If it is desired that the water resistance of the dried film be further increased, it is preferable to use ammonia, or a low boiling point amine compounds such as monomethylamine, dimethylamine, trimethylamine etc, which are evaporated and dispersed into the air at normal temperatures or when heated.

Hereunder, the method of producing the water dispersion type pressure-sensitive adhesive composition of the present invention will be described.

The first method is a method in which three components, namely the pressure-sensitive adhesive polymer (A), dispersant (C) and water are made into a water dispersion by mechanical stirring, followed by adding compound (B). Accordingly, in this first method there are no particular limitations regarding the polymerization method of the pressure-sensitive adhesive polymer (A). The second method is a method in which the monomer component constituting the starting material for producing pressure-sensitive adhesive polymer (A) is polymerized by an emulsion polymerization method in the presence of dispersant (C) to obtain a water dispersion, followed by adding compound (B). From the point of view of workability and working efficiency, the second method is more convenient and preferred.

In each of the above methods, it is preferable that dispersant (C) be used in an amount in the range of 0.5 to 10 parts by weight for every 100 parts by weight of pressure-sensitive adhesive polymer (A). If used in an amount less than 0.5 parts by weight, then it becomes difficult to stably disperse the pressure-sensitive adhesive polymer (A) in water. However, the use of dispersant (C) in an amount exceeding 10 parts by weight, is undesirable because then the effect of increasing the water resistance of the pressure-sensitive adhesive product by adding compound (B) is not sufficiently realized.

On the other hand, it is preferred that compound (B) be used in an amount of 0.1 to 10 equivalents with respect to one equivalent of the functional group of dispersant (C). It is further preferred that it be used in an amount of 0.5 to 5 equivalents. If it is used in an amount less than 0.1 equivalents, then a large portion of the functional groups of dispersant (C) remain. This means that the effect of increasing the water resistance cannot be sufficiently realized. Conversely, the use thereof in an amount exceeding 10 equivalents is not very desirable since a large number of the functional groups of compound (B) remain and the effect is lost.

If the water dispersion type pressure-sensitive adhesive polymer composition is stored for a long time after compound (B) is added to the water dispersion comprising pressure-sensitive adhesive polymer (A) and dispersant (C), the reaction between compound (B) and dispersant (C) proceeds with a resulting deterioration in the dispersion stability, and it is therefore preferable that the composition be applied relatively quickly after the addition of compound (B).

It is possible to add to the extent that they do not have a bad effect on the water resistance, conventionally known additives such as wetting agents, viscosity adjustors, thickener, pH adjustors, defoaming agents, improving agents, tackifiers, pigments, coloring agents, fillers, antioxidants, TV absorbents, UV stabilizers, etc.

Examples of tackifiers include (polymerized) rosins; (polymerized) rosin esters; terpene resins; terpene phenol resins; coumarone resins; coumarone indene resins; styrene resins; xylene resins; phenol resins; petroleum resins; etc. Almost all of the above compounds are oil soluble, and can therefore be dissolved in an organic solvent and added as it is to the water dispersion type pressure-sensitive adhesive polymer composition of the present invention. However, it is preferred that the above tackifiers are first made into a water dispersion using dispersant (C) used in the present invention, and then added to the composition. In the case that pressure-sensitive adhesive polymer (A) is synthesized by an emulsion polymerization, it is also possible to first dissolve the tackifier into the monomers which form the pressure-sensitive adhesive polymer and then carry out emulsion polymerization.

Hereunder, the method of making a pressure-sensitive adhesive product from the water dispersion type pressure-sensitive adhesive polymer composition of the present invention shall be described. The water dispersion type pressure-sensitive adhesive composition of the present invention is made into a pressure-sensitive adhesive product by applying it onto a substrate and forming a dried coating therefrom. Examples of types of pressure-sensitive adhesive products include pressure-sensitive adhesive sheet, tape, labels etc. in a form comprised of only a layer of pressure-sensitive adhesive without any support, a form comprised of a layer of pressure-sensitive adhesive on a single side of a support, or a form comprised of a layer of pressure-sensitive adhesive on both sides of a support.

In the case of the forms comprised of a layer of pressure-sensitive adhesive formed on one or both sides of a support, a pressure-sensitive adhesive product can be obtained by directly applying the water dispersion type pressure-sensitive adhesive composition onto the support and then drying it. A layer of pressure-sensitive adhesive having no support can be obtained by applying the water dispersion type pressure-sensitive adhesive composition to a release sheet and then drying it. After forming the layer of pressure-sensitive adhesive layer having no support, it is possible by the transfer thereof onto a support, to produce a product of the form having a layer of pressure-sensitive adhesive on one or both sides of a support. It is preferred that the various kinds of materials generally used in the prior art, such as paper, synthetic paper, plastic film, foamed sheet, nonwovens, etc. be used as the support.

The pressure-sensitive adhesive product of the present invention can be used in various fields and in various forms such as, for example, packaging tape, masking tape, industrial single-coated tape, industrial double-coated tape, paper labels, film labels, reflective sheet, protective sheet, films for preventing glass-scattering, heat shield films, medical adhesive products, adhesive products for office work etc.

Furthermore, the water dispersion type pressure-sensitive adhesive composition is not limited to use in the field of pressure-sensitive adhesive products. It can also be used in adhesives, paints, paper processing agents, fiber processing agents, mortar improving agents, sealing agents etc.

EXAMPLES

Hereunder, the present invention shall be explained in detail using several examples. The scope of the present invention shall not be limited to these examples. Furthermore, unless particularly specified, "%" and "parts" refer to "percentage weight" and "parts by weight" respectively.

Production Example 1 (Production of (C-1))

180 parts of isopropyl alcohol were charged into a flask having provided a stirrer, reflux condenser, a nitrogen gas inlet pipe, a thermometer and a dropping funnel. The temperature of the isopropyl alcohol was raised to 81° C., while introducing nitrogen gas therethrough and the isopropyl alcohol was refluxed in this way for ten minutes. Then a polymerizable monomer mixture which had been prepared in advance and comprised 144 parts of acrylic acid, 28.3 parts of n-dodecyl mercaptan, 33.6 parts of lauryl-tridecyl acrylate mixture, and 0.22 parts of an azobisisobutyronitrile as polymerization initiator was added dropwise into the flask over a period of two hours to carry out polymerization. After the completion of the drop-wise addition, it was aged for 1 hour under reflux conditions to obtain a polymer solution having a solid content of 53.4%. Next, the isopropyl alcohol was removed by under reduced pressure to obtain dispersant (C-1) containing carboxyl groups as functional groups. The acid value of the dispersant (C-1) was 544, and the number-average molecular weight was 1,200.

Production Example 2 Production of Dispersant (C-2)

100 parts of isopropyl alcohol were charged into a flask having provided a stirrer, reflux condenser, a nitrogen gas inlet pipe, a thermometer and a dropping funnel. The temperature of the isopropyl alcohol was raised to 81° C., while introducing nitrogen gas therethrough and the isopropyl alcohol was refluxed in this way for ten minutes. Then a polymerizable monomer mixture which had been prepared in advance and which comprised 17.3 parts of 2-isopropenyl oxazoline, 69 parts of methyl polyethylene glycol acrylate ("AM-90G" made by SHIN-NAKAMURA CHEMICAL CO., LTD.), 13.7 parts of n-dodecyl mercaptan and 0.05 parts of an azobisisobutyronitlile as polymerization initiator was added dropwise over a period of 1 hour to carry out polymerization. After completion of the dropwise addition, it was aged for 1 hour under reflux conditions. Then a further 0.05 parts of azo bis isobutyronitrile were added, and the reaction was continued for 13.5 hours. A polymer solution having a solid content of 48.6% was obtained. The isopropyl alcohol was then removed under reduced pressure to obtain dispersant (C-2) containing oxazolinyl groups as functional groups. The number-average molecular weight was 1,055.

Production Example 3 (Production of Pressure-Sensitive Adhesive Polymer (A) by Emulsion Polymerization Using Dispersant (C-1))

First, 100 parts of monomer components having the composition shown in Table 1, 0.01 parts of tert-dodecyl mercaptan as a molecular weight regulator, 3 parts of the dispersant (C-1) obtained in production example 1, 2 parts of 25% ammonia water, 0.05 parts of a 4, 4'-azobis(4-cyanovalericacid) (Product name: "V-501" made by Wako Pure Chemical Industries, Ltd., hereafter abbreviated as "V-501") and 35 parts of deionized water were mixed and stirred together to produce a monomer emulsion. Next, 33 parts of deionized water and 0.1 parts of polymerization initiator V-501 were put into a flask provided with a dropping funnel, a stirrer, a thermometer, a nitrogen gas inlet and a reflux condenser. The above monomer emulsion was then continuously added dropwise over a period of 3 hours at a temperature of 80° C. and in a nitrogen atmosphere, and the polymerization reaction was carried out. After the completion of the dropwise addition, the polymerization reaction was continued for about 3 hours at a temperature of 80° C. Finally, the solution was diluted with deionized water to the extent that the solid content became 55%, to obtain a water dispersion (CA-1) of the pressure-sensitive adhesive polymer. The solid content and glass transition temperature (°C.) are shown in Table 1.

Production Example 4 (Production of Pressure-Sensitive Adhesive Polymer (A) by Emulsion Polymerization Using Dispersant (C-1)

A water dispersion (CA-2) of pressure-sensitive adhesive polymer was obtained by the same kind of emulsion polymerization reaction as in production example 3 except that the monomer components were replaced by those shown in Table 1. The properties thereof are shown in Table 1.

Production Example 5 (Production of Pressure-Sensitive Adhesive Polymer (A) by Emulsion Polymerization Using Dispersant (C-1)

A water dispersion (CA-3) of pressure-sensitive adhesive polymer was obtained from the monomer components shown in Table 1 in the same way as production example 3 except that the amount of the dispersant (C-1) obtained in production example 1 used was 1.5 parts, the amount of tert-dodecyl mercaptan used was 0.03 parts, and potassium persulfate was used as the initiator instead of "V-501". The properties thereof are shown in Table 1.

Production Example 6 (Production of Pressure-Sensitive Adhesive Polymer (A) by Emulsion Polymerization Using Dispersant (C-1)

A water dispersion (CA-4) of pressure-sensitive adhesive polymer was made from the monomer components shown in Table 1 in the same way as production example 3 except that the amount of the dispersant (C-1) obtained in production example 1 used was 1.5 parts, and the amount of tert-dodecylmercaptan used was 0.02 parts.

Production Example 7 (Production of Pressure-Sensitive Adhesive Polymer (A) by Emulsion Polymerization Using Dispersant (C-1)

A water dispersion (CA-5) of pressure-sensitive adhesive polymer was made by the same kind of emulsion polymerization reaction as in production example 3 except that the monomer components were replaced by those shown in Table 1, and no tert-dodecyl mercaptan was used. The properties thereof are shown in Table 1.

Production Example 8 (Production of Pressure-Sensitive Adhesive Polymer (A) by Emulsion Polymerization Using Dispersant (C-2)

A water dispersion (CA-6) of pressure-sensitive adhesive polymer was made by the same kind of emulsion polymerization reaction as in production example 3 except that 8 parts of the dispersant (C-2) obtained in production example 2 were used, the monomer components were replaced by those shown in Table 1, and no tert-dodecyl mercaptan was used. The properties thereof are shown in Table 1.

Comparative Production Example 1 (Production by Emulsion Polymerization of a Pressure-Sensitive Adhesive Polymer for Comparison Purposes)

A water dispersion (A'-1) of a pressure-sensitive adhesive polymer for comparison purposes was obtained by the polymerization of the monomer components shown in Table 1 in the same way as production example 3 except that 2.0 parts of nonylphenyl ether sulfate ammonium salt emulsifying agent ("HITENOL N-08" made by DAI-ICHI KOGYO SEIYAKU CO., LTD.), which displays no reactivity with compound (B), was used as the emulsifying agent, and the amount of tert-dodecyl mercaptan used was 0.02 parts.

In Table 1, the names of the monomer compounds are abbreviated as detailed hereunder. Furthermore, the glass transition temperature Tg (°C.) of the pressure-sensitive adhesive polymer obtained in each production example was calculated using the equation discussed earlier and the glass transition temperatures (K) of homopolymer of each monomer as shown below.

| BA | n-butylacrylate | 219K |
|---|---|---|
| 2EHA | 2-ethylhexyl acrylate | 203K |
| DMAA | N,N-dimethyl acrylamide | 362K |
| NVP | n-vinyl pyrrolidone | 448K |
| HEA | 2-hydroxyethyl acrylate | 241K |
| HEMA | 2-hydroxyethyl methacrylate | 359K |
| MA | methyl acrylate | 283K |
| EA | ethyl acrylate | 249K |
| MAA | methacrylic acid | 501K |
| St | styrene | 373K |
| GMA | glycidyl methacrylate | 314K |

TABLE 1

| | Production Examples | | | | | | Comp. Prod. |
|---|---|---|---|---|---|---|---|
| | 3 | 4 | 5 | 6 | 7 | 8 | Example 1 |
| Monomer (parts) | | | | | | | |
| BA | 47.3 | 48.0 | — | 10.0 | 45.0 | 94.3 | 10.0 |
| 2EHA | 47.3 | 48.0 | 95.0 | 72.5 | 45.0 | — | 80.0 |
| DMAA | 5.4 | — | — | — | — | 5.4 | — |
| NVP | — | 4.0 | — | — | — | — | — |
| HEMA | — | — | 5.0 | — | 5.0 | — | 3.0 |
| HEA | — | — | — | — | — | 0.3 | — |
| MA | — | — | — | 16.0 | — | — | — |
| MAA | — | — | — | — | — | — | 5.0 |
| St | — | — | — | — | 5.0 | — | — |
| GMA | — | — | — | 1.5 | — | — | 2.0 |
| Dispersant (C-1) | 3.0 | 3.0 | 1.5 | 1.5 | 1.5 | — | — |
| Dispersant (C-2) | — | — | — | — | — | 8.0 | — |
| HITENOL N-08 | — | — | — | — | — | — | 2.0 |
| Pressure-sensitive adhesive polymer water dispersion No. | CA-1 | CA-2 | CA-3 | CA-4 | CA-5 | CA-6 | A'-1 |
| Solid content (%) | 54.9 | 55.5 | 55.7 | 56.0 | 54.8 | 55.8 | 55.0 |
| Tg (° C.) | −57 | −58 | −65 | −58 | −53 | −49 | −61 |

Example 1

To 100 parts of the water dispersion (CA-1) of the pressure-sensitive adhesive polymer obtained in production example 3, was mixed compound (B) of the type shown in Table 2 and in the amount shown in Table 2. The resulting mixture was stirred for 5 minutes using a stirrer to obtain water dispersion type pressure-sensitive adhesive composition (1) of the present invention.

Examples 2 to 10

The water dispersion of the pressure-sensitive adhesive polymer and a compound (B) of the types respectively shown in Table 2 were mixed and stirred together in the amounts shown in Table 2 and in the same way as example 1, to obtain water dispersion type pressure-sensitive adhesive compositions (2) to (10) of the present invention.

Example 11

To 100 parts of the pressure-sensitive adhesive polymer water dispersion (CA-3) obtained in production example 5 was added a compound (B) of the type shown in Table 2 and in an amount shown in Table 2, 0.3 parts of SN-DEFOAMER 154 (made by SAN NOPCO LIMITED) as a defoaming agent, 0.3 parts of PELEX OTP (made by Kao Corporation) as a wetting agent, 0.2 parts of a 25% aqueous solution of ammonia as a neutralizing agent and 0.6 parts by weight of Primer ASE-60 (made by Rohm & Haas) as a thickener. This was then mixed and stirred to obtain water dispersion type pressure-sensitive adhesive composition (11) of the present invention. The viscosity at 25° C. of this composition was 8200 mPa·s, and the pH was 8.2.

Comparative Example 1

The pressure-sensitive adhesive polymer water dispersion (CA-1) obtained in production example 3 was adopted as it is as water dispersion type pressure-sensitive adhesive composition (12) for comparative purposes.

Comparative Example 2

The pressure-sensitive adhesive polymer water dispersion (CA-4) obtained in production example 6 was adopted as it is as water dispersion type pressure-sensitive adhesive composition (13) for comparative purposes.

Comparative Example 3

To 100 parts of the pressure-sensitive adhesive polymer water dispersion (A'-1) obtained in comparative production example 1 was mixed a compound (B) of the type shown in Table 2 and in an amount shown in Table 2. The resulting mixture was stirred to obtain water dispersion type pressure-sensitive adhesive composition (14) for comparative purposes.

Comparative Example 4

To 100 parts of the pressure-sensitive adhesive polymer water dispersion (CA-1) obtained in production example 3 was mixed a compound (B) of the type shown in Table 2 and in an amount shown in Table 2. The resulting mixture was stirred to obtain water dispersion type pressure-sensitive adhesive composition (15) for comparative purposes.

The content of the compounds (B) listed in Table 2 is as follows:

DENACOL® EX-810:
  Made by NAGASE & CO., LTD. Di-functional; each functional group is a glycidyl group. Epoxy equivalent 112.
TETRAD®-C:
  Made by MITSUBISHI GAS CHEMICAL CO., LTD. Quatrofunctional; each functional group is a glycidyl group. Epoxy equivalent 92.
CHEMITITE® PZ-93:
  Made by NIPPON SHOKUBAI CO., LTD. Trifunctional; each functional group is an aziridinyl group. Molecular weight 425.

EPOLIGHT® M-1230:

Made by KYOEISHA CHEMICAL CO., LTD. Monofunctional; the functional group is a glycidyl group. A mixture of higher alcohol glycidyl ether containing 55% of $C_{12}$ and 45% of $C_{13}$. Epoxy equivalent 311.

Triazine:

Made by taking 26.1 parts of 2, 4 - dimercapto - 6 - dibutylamino - 1, 3, 5 - triazine, 3.9 parts of "PELEX OTP" made by Kao Corporation, and 70 parts of deionized water and making them into a water dispersion using a sandmill. The functional group is a mercapto group.

Coronate® L-55E:

Made by NIPPON POLYURETHANE INDUSTRY CO., LTD. Trifunctional; each functional group is a isocyanate group. NCO content 9.6 weight percent.

adhesive tape made using the composition of example 9 was exclusively subject to drying for 30 minutes at 120° C.

The methods for measuring each property were as follows:

Shear Adhesion Normal conditions):

Performed according to JIS Z 0237. An adhesive tape having a width of 25 mm and a length of about 150 mm was stuck onto a stainless steel plate over an sticking area of 25 mm×25 mm. The part of the tape which was not stuck to the stainless steel plate was folded over inwards to obtain a test sample. The test sample was then suspended vertically in a thermostat at 80° C. A 1 kg load was hung from the folded-over part of the adhesive tape. The test sample was left in this condition for 24 hours. The amount (mm) of slip after 24 hours or, as the case may be, the length of time before dropping was measured.

TABLE 2

| | Pressure-sensitive adhesive polymer water dispersion No. and amount (parts) | | Compound (B) | | | Pressure-sensitive Adhesive Composition No. |
|---|---|---|---|---|---|---|
| | | | Type | Amount (parts) | Equivalent* | |
| EXAMPLES | | | | | | |
| 1 | (CA-1) | 100 | DENACOL ® EX-810 | 3.49 | 2 | (1) |
| 2 | (CA-1) | 100 | TETRAD ®-C | 1.44 | 1 | (2) |
| 3 | (CA-1) | 100 | TETRAD ®-C | 2.87 | 2 | (3) |
| 4 | (CA-1) | 100 | CHEMITITE ® PZ-33 | 1.11 | 0.5 | (4) |
| 5 | (CA-2) | 100 | TETRAD ®-C | 1.44 | 2 | (5) |
| 6 | (CA-3) | 100 | TETRAD ®-C | 1.44 | 2 | (6) |
| 7 | (CA-4) | 100 | TETRAD ®-C | 1.44 | 2 | (7) |
| 8 | (CA-5) | 100 | TETRAD ®-C | 1.44 | 2 | (8) |
| 9 | (CA-3) | 100 | EPOLIGHT ® M-1230 | 4.87 | 2 | (9) |
| 10 | (CA-6) | 100 | Triazine | 1.70 | 0.5 | (10) |
| 11 | (CA-3) | 100 | TETRAD ®-C | 1.44 | 2 | (11) |
| COMP | | | | | | |
| 12 | (CA-1) | 100 | NONE ADDED | | | (12) |
| 13 | (CA-4) | 100 | NONE ADDED | | | (13) |
| 14 | (A'-1) | 100 | TETRAD ®-C | 1.44 | — | (14) |
| 15 | (CA-1) | 100 | Coronate ® L-55E | 6.81 | 1 | (15) |

*Equivalent of functional groups of compound (B) with respect to the carboxyl groups or oxazolinyl groups from the dispersant in the pressure-sensitive adhesive polymer water dispersion.

Property Evaluation Methods

Each of the water dispersion type pressure-sensitive adhesive compositions obtained in examples 1 to 10 and comparative examples 1 to 4 were respectively applied to a polyethylene terphthalate film having a thickness of 25 μm such that the thickness of the coating after drying was 25 μm. It was then dried for 2 minutes in a hot air dryer at 105° C., and then covered with a release sheet (K-80HS: made by Kaken Kogyo Sha), to make it into an adhesive tape. This adhesive tape was aged for at least one week in an atmosphere having a temperature of 23° C. and a humidity of 65%, and then the adhesion properties thereof were evaluated according to the following methods. The results are shown in Table 3. The composition (11) obtained in example 11 was directly applied to an oriented polypropylene film, which had been treated by application of a releasing agent "RP15W" made by NIPPON SHOKUBAI CO., LTD., such that the thickness of the coating after drying was 25 μm. It was then dried for 2 minutes in a hot air dryer at 105° C., and then transferred to a polyethylene terephthalate film having a thickness of 25 μm to make it into an adhesive tape. The Shear Adhesion (After Immersion in Water)

A test sample was prepared in the same way as in the test to measure shear adhesion under normal conditions. It was then immersed in water at 23° C. for 24 hours. Immediately after it was taken out of the water, it was suspended in a thermostat at 80° C. and a 1 kg load was hung therefrom. It was left in this condition for 24 hours. The amount (mm) of slip after 24 hours or, as the case may be, the length of time before dropping was measured.

The result is shown as a ○ if there was no difference between the value of the shear adhesion under normal conditions and that after immersion in water, and is shown as a × if there was a difference between the value of the shear adhesion under normal conditions and that after immersion in water.

Adhesive Strength (Normal Conditions)

According to JIS Z 0237. The force of resistance (230° C.) measured when the adhesive tape having a width of 25 mm stuck to a stainless steel plate was peeled off at an angle of 180°.

Adhesive Strength (After Immersion in Water)

According to JIS Z 0237. A portion of the adhesive tape having a width of 25 mm was stuck to a stainless steel plate and left immersed in water at 23° C. for 24 hours. Immediately after it was taken out of the water, the force of resistance (23° C.) when the tape was peeled off at an angle of 180° was measured.

The results are based on the following criteria.
- ○ Peeling occurred at the interface (interfacial failure) between the stainless steel plate and the pressure-sensitive adhesive layer at an adhesive strength under normal conditions of 400 g/125 mm or more, and an adhesive strength after immersion in water of 400 g/25 mm or more.
- Δ Interfacial failure at an adhesive strength under normal conditions in the range of 300 g/25 mm to 400 g/25 mm, and an adhesive strength after immersion in water in the range of 300 g/25 mm to 400 g/25 mm or more.
- × Adhesive tape fractured between the pressure-sensitive adhesive layer and the polyethylene terephthalate film, at an adhesive strength of less than 300 g/25 mm, or when the adhesive strength after immersion in water was measured.

Water Absorptivity

The weight of a piece of adhesive tape cut to dimensions of 25 mm×70 mm was measured and was taken to be Wa. This piece of adhesive tape was then immersed in 50 cc of water at 23° C. for 24 hours. It was then taken out of the water and the water remaining on the surface was lightly wiped off. The weight thereof was then measured again and was taken to be Wb. Then the weight of a piece of polyethylene terephthalate film of dimensions 25 mm×70 mm was separately measured and taken to be Wc. The water absorptivity was calculated according to the following equation using these weights.

Water Absorptivity $(\%) = \{(Wb-Wa)/(Wa-Wc)\} \times 100$

The result is marked as a ○ if the water absorptivity was less than 20%, as a Δ if it was equal to or greater than 20% but less than 40%, and as a × if it was equal to or greater than 40%.

Water resistance (Resistance of Whitening)

A piece of adhesive tape cut to dimensions of 25 mm×70 mm was immersed in 50 cc of water at 23° C. for 24 hours. The whitening of the pressure-sensitive adhesive was visually evaluated. The result is marked as a ○ if it looked transparent, and is marked as a × if it was whitened.

TABLE 3

| Pressure-sensitive adhesive comp. No. | Shear Adhesion | | | Adhesive Strength | | | Water Absorptivity | | Water Resistance |
|---|---|---|---|---|---|---|---|---|---|
| | Normal Conditions | After water immersion | Result | Normal Conditions | After water immersion | Result | After water immersion | Result | |
| (1) | 0 | 0 | ○ | 480 | 530 | ○ | 15.7 | ○ | ○ |
| (2) | 0 | 0 | ○ | 420 | 530 | ○ | 7.0 | ○ | ○ |
| (3) | 0 | 0 | ○ | 470 | 570 | ○ | 5.8 | ○ | ○ |
| (4) | 0 | 0 | ○ | 420 | 870 | ○ | 2.9 | ○ | ○ |
| (5) | 0 | 0 | ○ | 530 | 1030 | ○ | 6.0 | ○ | ○ |
| (6) | 0 | 0 | ○ | 580 | 1130 | ○ | 5.2 | ○ | ○ |
| (7) | 0 | 0 | ○ | 350 | 490 | ○ | 5.5 | ○ | ○ |
| (8) | 0 | 0 | ○ | 580 | 1140 | ○ | 2.7 | ○ | ○ |
| (9) | 0 | 0 | ○ | 750 | 640 | ○ | 22.4 | Δ | ○ |
| (10) | 0.1 | 0.1 | ○ | 450 | 410 | ○ | 8.5 | ○ | ○ |
| (11) | 0 | 0 | ○ | 620 | 1210 | ○ | 5.4 | ○ | ○ |
| Comp. (12) | 0 | Drop after 3.8 hours | X | 810 | 1330* | X | 53.3 | X | X |
| Comp. (13) | 0.1 | 0.1 | ○ | 640 | 1000* | X | 30.2 | Δ | ○ |
| Comp. (14) | 0 | 0 | ○ | 30 | — | X | 4.6 | ○ | ○ |
| Comp. (15) | 0 | 0 | ○ | 540 | 150 | X | 29.8 | Δ | X |

*Fracture between the polyethylene terephthalate film and the pressure-sensitive adhesive layer.

It is clear from Table 3 that the adhesive tapes made from the water dispersion type pressure-sensitive adhesive compositions of the present invention are excellent in terms of balance between shear adhesion and adhesive strength, and water resistance, namely, shear adhesion after immersion in water, adhesive strength after immersion in water, water absorptivity, and resistance of whitening in water.

On the other hand, water dispersion type pressure-sensitive adhesive composition (12), which was made for comparative purposes, did not have mixed therewith a compound (B) which could react with the carboxyl groups of the dispersant (C), and thus the adhesive tape made therefrom was poor in terms of water resistance properties such as shear adhesion after immersion in water, adhesive strength after immersion in water, water absorptivity, resistance of whitening in water etc.

Water dispersion type pressure-sensitive adhesive composition (13), which was also made for comparative purposes, also did not have a compound (B) mixed therewith, and was therefore also poor in terms of water resistance properties. However, due to the fact that glycidyl groups (from the GMA) had been introduced into the pressure-sensitive adhesive polymer, its water resistance properties were slightly improved compared to composition (12).

Water dispersion type pressure-sensitive adhesive composition (14), which was also made for comparative purposes, was made using, as the water dispersant, an emulsifying agent available on the market which has no functional groups and thus even though compound (B) was added, there was no reaction between the two. It is thought that compound (B) reacted with the functional groups contained in the pressure-sensitive adhesive polymer (A'-1), with the result that the pressure-sensitive layer became quite cross-linked. This can be seen from the small value measured for the adhesive strength under normal conditions.

The adhesive tape made from water dispersion type pressure-sensitive adhesive composition (15), which was made for comparative purposes, was made using "Coronate®", which is a compound containing isocyanate groups, as the compound (B) capable of reacting with the dispersant (C), and thus the adhesive strength after immersion in water, water absorptivity and resistance of whitening in water were not good

EFFECT OF THE INVENTION

The water dispersion type pressure-sensitive adhesive composition of the present invention is comprised of a pressure-sensitive adhesive polymer (A), a water dispersant (C) containing hydrophilic functional groups, and a compound (B) which contains functional groups which are capable of reacting with the hydrophilic functional groups of dispersant (C), and thus the hydrophilic groups of dispersant (C) can be made hydrophobic through reaction between the functional groups of dispersant (C) and the functional groups of compound (B). As a result, excellent adhesive strength and remarkably improved water resistance properties are manifested when the composition of the present invention is formed into a dried coating.

The pressure-sensitive adhesive product of the present invention is clearly superior in terms of water absorptivity and resistance of whitening in water compared to products made from conventional water dispersion type pressure-sensitive adhesive compositions. There is observed no reduction in shear adhesion or adhesive strength after immersion in water, and it displays levels of water resistance on a par with products made from solvent type pressure-sensitive adhesive compositions which do not use emulsifying agents. Accordingly, the product of the present invention can be used instead of a product made from a solvent type pressure-sensitive adhesive, even in those situations in which the adhesive is to be used in places demanding water resistance, and is also an invention of extremely important meaning from the viewpoint of safety in the working environment, protection of the global environment, resource saving etc.

We claim:

1. In a water dispersion pressure-sensitive adhesive composition comprising a water-insoluble pressure-sensitive adhesive polymer (A); the improvement wherein said composition contains:

a compound (B) having in its molecule at least one functional group selected from the group consisting of a glycidyl group, an aziridinyl group, an acetoacetyl group and an oxazolinyl group; and wherein said compound (B) is capable of having the action of forming chemical bonds with the hydrophilic functional groups of an emulsifying agent (C); to thereby nullify the hydrophillic nature of the emulsifying agent (C) and a hydrophilic emulsifying agent (C) having in its molecule both a hydrophobic hydrocarbon group and hydrophilic functional groups which react with said compound (B); wherein said emulsifying agent (C) is an amino group-containing dispersant or a carboxyl-containing dispersant; wherein said emulsifying agent (C) is capable of dispersing said water-insoluble pressure-sensitive adhesive polymer (A) in water; wherein said water insoluble pressure-sensitive adhesive polymer (A) is dispersed by said emulsifying agent (C) in said composition: and wherein said pressure-sensitive adhesive polymer (A) is a polymer made from polymerizable monomer components comprising, as essential components, at least one alkyl(meth)acrylate having an alkyl group having 4 to 14 carbon atoms, and at least one unsaturated monomer having a solubility parameter of not less than 11.

2. The water dispersion pressure-sensitive adhesive composition according to claim 1 wherein said compound (B) is a compound (B-2) having in its molecule at least two functional groups of at least one type selected from the group consisting of a carboxyl group, an amino group, a glycidyl group, an aziridinyl group, an acetoacetyl group, an oxazolinyl group, a mercapto group, a hydrazide group, and an aldehyde group.

3. The water dispersion pressure-sensitive adhesive composition according to claim 1, wherein said dispersant (C) is a water soluble or water dispersible polymer (c), and/or a salt thereof, having an acid value of not less than 200 and obtained by polymerizing polymerizable monomer components comprising, as an essential component, an unsaturated carboxylic acid, in the presence of an alkyl mercaptan having an alkyl group having 6 to 18 carbon atoms.

4. A water dispersion pressure-sensitive adhesive composition obtained by emulsion polymerization of starting monomeric components for a pressure-sensitive polymer in the presence of a dispersant having in its molecule both a hydrophobic hydrocarbon group and hydrophilic functional groups, followed by addition of a compound, wherein said compound has in its molecule at least one functional group selected from the group consisting of a glycidyl group, an aziridinyl group, an acetoacetyl group, an acetoacetyl group, an oxazolinyl group, or containing a metal having a valence of at least two;

the functional groups and the metal being capable of having the action of forming chemical bonds with the hydrophilic functional groups of the dispersant to thereby nullify the hydrophilic nature of the dispersant:

and the functional groups of said compound being different from the hydrophilic functional groups of the dispersant, which hydrophilic functional group of the dispersant is carboxyl group or amino group.

* * * * *